US008066044B2

(12) United States Patent
Lichtenberg et al.

(10) Patent No.: US 8,066,044 B2
(45) Date of Patent: Nov. 29, 2011

(54) METHOD AND APPARATUS FOR HIGH SPEED PRODUCE LABELING

(75) Inventors: Aron Lichtenberg, Beverly Hills, CA (US); John F. Shaw, Beverly Hills, CA (US); Duy P. Le, Santa Monica, CA (US); Heath Jensen, Los Angeles, CA (US)

(73) Assignee: Hurst International, LLC, Chatsworth, CA (US)

( * ) Notice: Subject to any disclaimer, the term of this patent is extended or adjusted under 35 U.S.C. 154(b) by 75 days.

(21) Appl. No.: 12/424,800

(22) Filed: Apr. 16, 2009

(65) Prior Publication Data

US 2010/0096089 A1 Apr. 22, 2010

Related U.S. Application Data

(60) Provisional application No. 61/045,900, filed on Apr. 17, 2008.

(51) Int. Cl.
*B32B 41/00* (2006.01)

(52) U.S. Cl. ......... 156/351; 156/366; 156/367; 156/368

(58) Field of Classification Search .................. 156/351, 156/366, 367, 368, 542, 567, 568, 572, 556
See application file for complete search history.

(56) References Cited

U.S. PATENT DOCUMENTS 3,373,785 A 3/1968 Anderson
3,404,059 A 10/1968 Ritterhoff
3,450,590 A 6/1969 La Mers
5,111,562 A 5/1992 Burka
5,489,360 A 2/1996 Shimizu et al.
5,645,680 A 7/1997 Rietheimer
5,829,351 A 11/1998 Anderson et al.
5,858,143 A 1/1999 Bright et al.
6,047,755 A 4/2000 Anderson et al.
6,179,030 B1 1/2001 Rietheimer
6,219,438 B1 4/2001 Giordano et al.
6,230,779 B1 5/2001 Anderson et al.
6,230,780 B1 5/2001 Rietheimer
6,257,294 B1 * 7/2001 Weisbeck ...................... 156/356
6,408,916 B1 6/2002 Anderson et al.
6,427,746 B1 8/2002 Anderson et al.
6,595,259 B2 7/2003 Whitby
6,604,623 B2 8/2003 Sumi et al.
6,695,501 B2 2/2004 Nedblake, Jr. et al.
(Continued)

FOREIGN PATENT DOCUMENTS

JP 3085240 A 4/1991

*Primary Examiner* — George Koch
(74) *Attorney, Agent, or Firm* — Tutunjian & Bitetto, P.C.

(57) ABSTRACT

An apparatus for high speed labeling of produce including a turret which carries label depositor arms and continuously rotates so that its fully extended tangential speed matches the produce conveyor speed. The label depositor arms are reciprocated along a predetermined path by a mechanical linkage. A supply of pressurized air and vacuum are selectively delivered to the label depositor arms to pick-up a print-on-demand label and adhere it to the produce. One or more rotating turrets are included within a system for high speed labeling. The system monitors a common shaft which drives a conveyor that moves multiple lanes of produce under corresponding turrets. A conveyor offset signal in combination with a printer offset control, allows the system to independently synchronize the high-speed labeling operation at each lane.

22 Claims, 7 Drawing Sheets

U.S. PATENT DOCUMENTS 6,729,375 B2 * 5/2004 Nielsen et al. ................ 156/362
6,792,992 B2 9/2004 Goetz
6,820,672 B1 11/2004 Smits
7,021,353 B2 4/2006 Constantine et al.
7,168,472 B2 * 1/2007 Hirst et al. .................... 156/387
7,178,574 B2 2/2007 Nielsen et al.
2001/0018945 A1 9/2001 Instance
2006/0048898 A1 * 3/2006 Christie ........................ 156/540
2006/0111845 A1 5/2006 Forbis et al.
2007/0017640 A1 1/2007 Constantine
2007/0074819 A1 4/2007 Constantine

* cited by examiner

METHOD AND APPARATUS FOR HIGH SPEED PRODUCE LABELING

RELATED APPLICATION INFORMATION

This application claims priority to Provisional Application Ser. No. 61/045,900 filed on Apr. 17, 2008, the entire contents of which are incorporated herein by reference thereto.

BACKGROUND OF THE INVENTION

1. Field of the Invention

The present invention relates to a method and apparatus for high speed produce labeling. More particularly, it relates to an integrated system which provides on-demand print labeling for single and multiple conveyor lanes driven by a common shaft.

2. The Prior Art

For produce labeling, roll labels are picked-up by extendable arms of a rotating label transfer device. The arm extends as it descends over a conveyor to place the label on to the produce as it passes below the rotating label transfer device. U.S. Pat. No. 5,645,680 shows two different label rolls 16 and 18. The system is designed to label up to two different varieties of produce, by selecting labels from the appropriate roll. This system differs from the present invention in that it does not provide on-demand print labeling, and that it lacks bellows on the terminal arm ends. U.S. Patent Application Publication 2007/0074819 shows three or more label rolls but lacks extending label depositor arms which limit the variety of produce that can be labeled in a single lane.

U.S. Pat. No. 7,178,574 provides a stepper motor that only rotates the label transfer device when produce is detected in a certain region of a wide conveyor belt. The patent utilizes bellows, but they are extended under positive pressure. In order to extend faster, more pressure is needed which can damage delicate produce. Similarly, U.S. Pat. No. 6,257,294 shows depositor arms which extend under the force of pressurized air.

SUMMARY OF THE INVENTION

Accordingly, it is an object of the present invention to provide a system which independently controls a single or multiple lanes of high speed produce labeling.

It is another object of the invention to account for differences in conveyor position from lane to lane.

It is a further object to provide control over the timing of label dispensing.

These and other related objects are achieved according to an embodiment of the invention relating to a system for high speed labeling of produce having one or multiple continuously servo-driven and controlled rotating turrets having label dispensers and labeling applicators disposed above a corresponding number of conveyor lanes driven by a common shaft. A conveyor shaft rotary encoder transmits electrical pulses representative of conveyor speed and an indexing signal identifying an absolute radial position of the shaft to a turret controller. The turret controller receives the electrical pulses and indexing signal for common control of servo motors for each rotating turret so that the linear speed at the labeling applicators is equal to the conveyor speed. A conveyor offset signal is transmitted to the turret controller for each lane representative of a difference in a conveyor cup position relative to the absolute radial position of the conveyor shaft, so that the tangential relationship between labeling applicators and individual cups can be adjusted for each turret. A servo tach output from the turret controller comprises a unique printer offset control for each lane that determines when a label is dispensed relative to the corresponding labeling applicator, so that the relationship between the timing of the dispenser's label ejection and the applicators can be adjusted for each turret. The conveyor offset signal in combination with the printer offset control allows the turret controller to selectively control the radial orientation of each servo motor and the label dispensing timing to independently synchronize the high-speed labeling operation at each lane.

It is another object of the present invention to provide a bellows and boot tip configuration which improves produce contact regardless of the size and shape.

It is a further object of the invention to provide a mechanical linkage for reciprocating the label depositor arms.

It is another object of the present invention to utilize air pressure in combination with a pre-expanded bellows to improve produce contact without effecting depositor arm extension speed.

These and other related objects are achieved according to an embodiment of the invention relating to an apparatus for high speed labeling of produce including a rotating turret. The rotating turret includes a plurality of depositor arms equally spaced in a radial patter and each having a pre-expanded bellows and a removably attached boot tip. The turret further includes a mechanical linkage for reciprocating the depositor arms along a predetermined path as a function of the turret's rotational position. A supply of vacuum is communicated through said turret and selectively delivered to the depositor arms to retain a label on the boot tip until it is applied to the produce. A supply of pressurized air is communicated through the turret and selectively delivered to the depositor arms to provide resistance to boot tip retraction and to provide a positive label application force on to the produce.

The turret includes a fixed cam wheel, which interacts with a cam follower mounted on the inner radial (proximate) end of the movable sleeve portions of each label depositor arm. The air pressure and vacuum level can be modulated to fine-tune label application, without effecting sleeve reciprocation which is controlled by the contoured camming surface of the cam wheel. In addition, the air pressure and vacuum level can be modulated to control the bellows compression force without effecting the bellows front-to-back and side-to-side flexibility. The apparatus further includes a conveyor disposed below said rotating turret, wherein said turret is continuously rotated so that the linear speed at the boot tip of the fully extended depositor arm is equal to the conveyor speed.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

Figure 1:
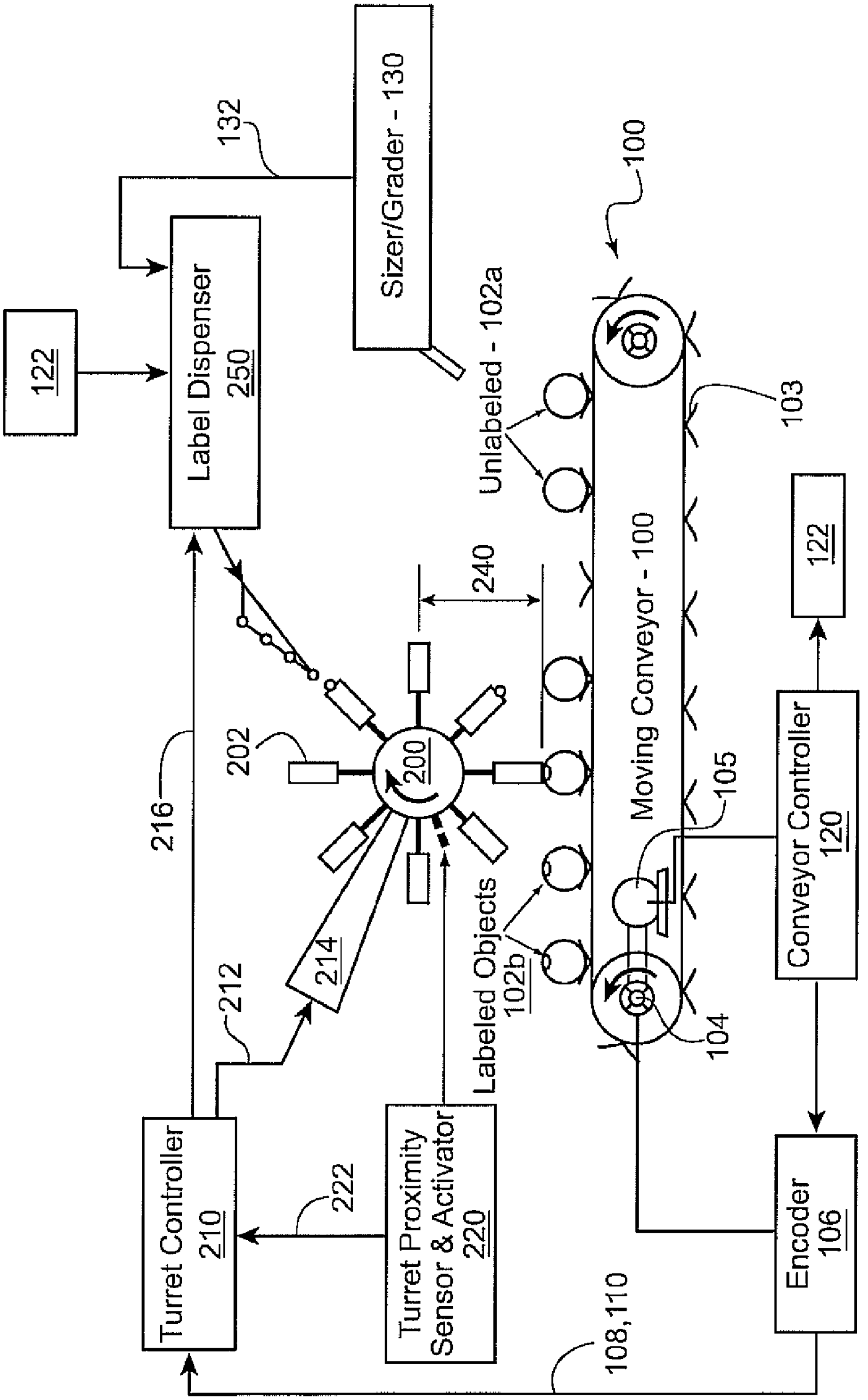
FIG. 1 is a schematic view of components of an embodiment of the high speed labeling system according to the invention.

In general, the method and apparatus according to the inventions provides an integrated system for on-demand printing. A single system can be configured for a single or multiples lanes, e.g. one, two or more lanes. The system is suspended over a sizer and/or grader which delivers produce, including fruit and vegetables along the multiple lanes. Information from the sizer/grader is communicated to our system to generate on demand custom labels.

Each lane of the system waits for a signal coming from the sizer/grader before a label can be printed, dispensed and applied. The signal, once transmitted, provides the system with specific ID information on the piece of fruit being labeled. This information could be related to characteristics of a specific piece of produce such as: size, grade, lot number, sweetness, maturity and other information that identifies each item's features and origin. The signal has also the necessary timing required to start the labeling process in relation to the transportation of this specific piece of produce through the conveying line. Since each piece of fruit could be different in characteristics from the previous one, the information being printed on the label immediately before it is dispensed onto the applicator can be different, thereby resulting in a "print-on-demand".

The system includes software which has the ability to retard or speed up the label ejection onto the pre-extended bellow and boot tip in order to compensate for hardware manufacturing variations that are inherent to any high speed mechanical system. The home position of each turret is determined by an inductive proximity sensor that could either have inherent reaction time delays, or could be slightly misplaced on the turret in a different radial position or slightly further from the activating metal pin that establishes the home position.

The software has an integrated label editor that is capable of creating new graphics to be printed on demand by the printer/dispensing units. The elements that could be used to create new labels are graphics, text, bar codes, lot number and date information. Any graphics file preloaded into the PC such as jpeg and bmp files. These graphics are scalable to fit onto different size labels or differently size print areas. Any text can be applied using Windows fonts, types and formatting capabilities. The text can be rotated in 90-degree increments and can also be curved in any circular or elliptical shape. Optionally, a bar code generator module can be coupled to the system to create any type of barcode.

To incorporate lot numbers, an alphanumeric variable data field can be placed on the label that could be changed on demand and on the fly from the main system menu. This is used to accomplish item level traceability. The unique lot number references the packinghouse records that are created to identify the origin of the produce being packed. These records will trace back the produce to the growing fields and will also tie into the pre harvest records. This is the only available method to full traceability on fresh produce at item level in the world using an on-line high speed labeling system. The selected Lot Number can be uploaded onto the printer/dispensing units at any time on demand and on the fly without affecting the overall system operation.

For date information, a variable data date field can be placed on the labels representing the current date of packing. The date output can be changed to any format in the event that the packer does not wish to openly share this information with the public or whishes to use it instead for internal purposes. The date changes automatically based on the PC clock settings.

The software also has a Select Label window where the user can graphically select which labels to use. Labels can be selected by lane and by sizer/grader input. This grid system allows the flexibility to select specific labels for each separate lane if so desired. The selected labels can be uploaded onto the printer/dispensing units at any time on demand and on the fly without affecting the overall system operation. Other features of the software are a System Settings editing window, a System User Setting window, a motor programming window, and application and system shut down buttons as well as a login user window. Additional options include an individual printer counter with absolute counts and reset counts.

Each label is ejected from the printer/dispenser unit on an approximately angle of 30 degrees from the vertical plane. Labels can vary in size from a small 0.8" long by 0.5" wide to a large 1.25" long by 1" wide. The label is facing down with the adhesive facing up. The label is ejected at a constant speed and timed according to the speed of the sizer/grader. The application device has a turret that contains an exemplary 8 or 12 label collecting depositors evenly spaced around the turret.

The turret is in constant motion as it follows the motion of the sizer/grader by means of a speed encoded attached to the sizer's main drive shaft. Each depositor corresponds to a single position on the sizer conveyor line. A label is ejected onto the depositor only when a sizer/grader sends a signal to the label. This means that not all depositors will receive a label each time they pass the label dispenser. Only depositors that will encounter produce and are required to be labeled will receive a label.

The turret includes a central air manifold that communicates positive and negative (vacuum) air pressure to the end of each depositor. The vacuum is used to pick up and retain a label. When a depositor is at a vertical down position (6 o'clock) the vacuum is suspended and positive air is communicated to blow the label off. The depositors include a telescoping shaft and bellow tip which will be described in greater detail below.

The turret's rotational movement is effected by a servomotor and a 90 degree angle gearbox. The motor is controlled and driven by its own firmware and software developed for this specific application. The motor package also contains a built in PLC that is used also to control its operational capabilities locally at each applicator's lane. The motor package can be either controlled locally on each applicator lane or by a PC connected to the entire system. The motor is also used to send timing signals and labeling signals to the printer/dispensing unit. The turret has a metal pin which is used to activate an inductive sensor that is used to physically determine the home position of each turret. The rotational position of each turret in relation to the sizer's conveying system has to be kept in close relationship in order to always land at the center of each cup and to label the proper piece of fruit.

The sizer/grader has a labeling output card which signals when and what to label. These signals are received by the application system's interface and transmit this information to each of the printer/dispensing units. These labeling signals together with the applicator motor's timing signal provide the necessary information to the printer/dispensing unit to print and eject the proper label at the correct time. In practical applications, the system is powered by a 240V single phase power source, which is distributed at 24V, 36V, 120V and 240V to various components.

Figure 2:
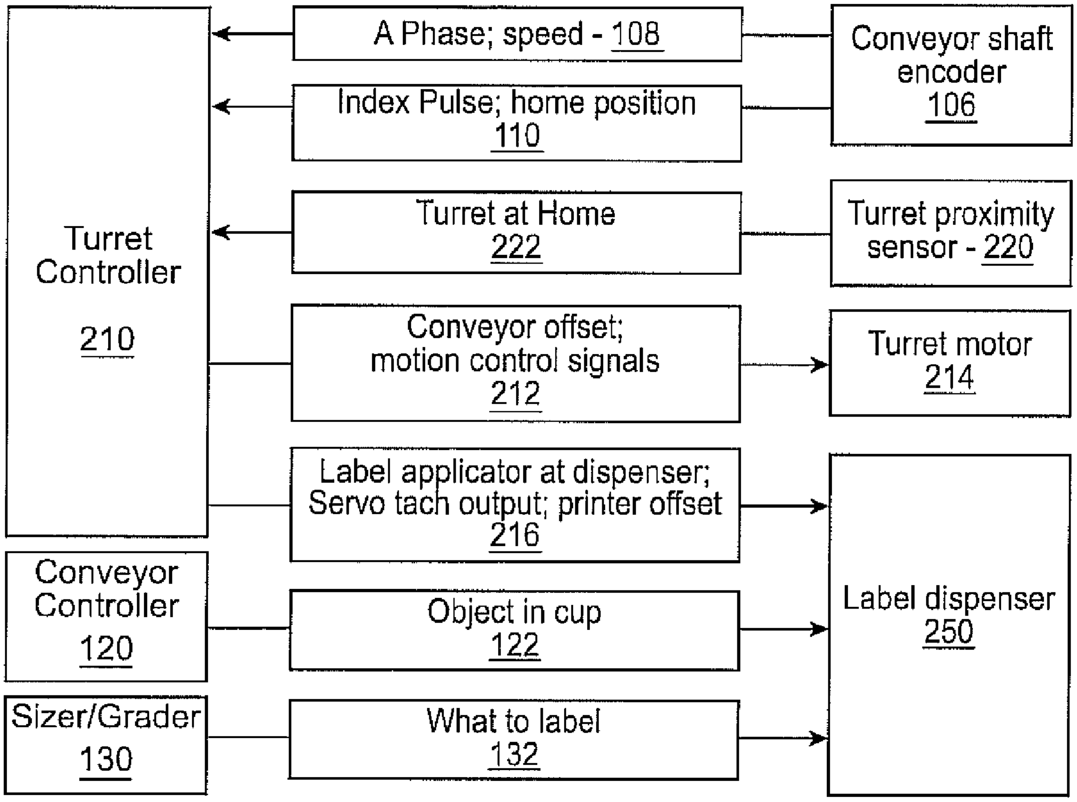
FIG. 2 is a block diagram of signals and paths according to an embodiment of the invention.

An overview of the system components, related controllers and signal paths will be provided with reference to FIGS. 1 and 2. A rotating turret 200 is suspended above a moving conveyor 100. Turret 100 includes label depositor arms 202 which pick-up printed labels from label dispenser 250 and adheres the labels on to produce passing below on conveyor 100. A turret controller 210 receives signals from various sensors to control the speed and rotational position of turret 200. The conveyor 100 is illustrated as a single lane. In practical applications, the conveyor is many feet wide and encompasses multiple lanes each having a turret suspended above it. Accordingly, the controller may be configured to operate multiple turrets, i.e. one per lane. Alternatively, a master controller may be provided along with multiple slave controllers, each of which controls a single turret.

Turret 200 turns in a radial motion from its center and is aligned to accept labels from the label dispenser 250 and deposit them onto unlabeled objects 102*a* moving along conveyor 100. Turret 200 moves synchronously with conveyor 100 so that the speed of a fully extended arm at radius 240 where the label is applied matches 1 to 1 with the conveyor's linear speed and therefore the items being carried thereon.

Each label depositor arm 202 is a flexible device designed to accept a label from the label dispenser 250 and apply it to an object 102*a* through contact. One turret may have a number of Label Applicators spaced evenly on the turret. Label depositor arms are also referred to as labeling applicators.

Label Dispenser 250 holds a reel of on-demand printable labels and ejects them at a location close to where the label depositor arms will pass so that they will be picked up via suction by the label depositor arm as it spins past the dispenser.

Conveyor 100 is a moving belt or chain link device that moves items to be labeled in a linear motion under the turret and label depositor arms. Items on the Conveyor are confined to specific locations called cups 103, which are spaced, at consistent intervals along the conveyor.

Conveyor Controller 120 controls the movement of the conveyor and employs sensors to determine presence of objects in the Conveyor's cups. It generates an Object In Cup signal 122 to indicate if an object is present in a cup at a specific location. When an Object in Cup signal is present, a produce sizer and grader scanner 130 will provide size and grade data to determine the type of label which is needed.

Conveyor controller 120 principally operates a conveyor motor 105 coupled to a conveyor shaft 104 which rotates to cause the conveyor to advance. Shaft 104 is designed in such a way that an exact whole number of conveyor cups 103 are advanced per one revolution. In practical applications, a single motor 105 and shaft 104 are utilized to drive all lanes of the conveyor. From a motive perspective, all lanes comprise one large conveyor. However, if the lanes utilize carrier chains, variations from chain to chain can occur.

Turret Proximity Sensor 220 is a position sensor comprised of two parts; a sensor mounted in a stationary position and an activator (such as a metal pin) mounted to the moving turret 200. Turret proximity sensor 220 is used to determine the home position of the turret.

Turret Controller 210 is a programmable device that is used to process input signals, generate output signals and to control turret motor 214. A description of the signals and signal paths used in applicant's system can be seen in FIG. 2 and are described as follows.

Conveyor Encoder 106 is a radial encoder placed on conveyor shaft 104. Conveyor shaft encoder 106 generates two signals an A Phase signal 108 and an Index Pulse 110, which are used to control the motion of the turret. First, an A Phase signal 108 indicates conveyor motion by evenly pulsing a specified number of times, typically 1000 per revolution of conveyor shaft 104. The A Phase Signal 108 is used by turret controller 210 to synchronize the speed of turret motor 214 to the conveyor speed. Second, an Index Pulse 110 indicates that the conveyor shaft 104 is at its home position by pulsing at an exact shaft position once per revolution. Index pulse 110 is used to indicate where cups 103 are in relation to the conveyor shaft. Index pulse 110 is used by the turret controller 210, as will be described in greater detail below.

A Turret At Home signal 222 indicates that the turret is at position where the stationary Turret Proximity Sensor 220 is lined up with the sensor activator mounted on the Turret. The Turret at Home signal 222 comes from Turret Proximity Sensor and is used by the Turret Controller.

Motion Control Signals 212 are generated by the Turret Controller to move the Turret Motor 214 for homing and label application.

Label Applicator At Dispenser signal 216 indicates that the label applicator is in position to receive a label from the label dispenser. The pulse rate per turret revolution is equal to the number label applicators on the turret. The Label Applicator at Dispenser signal 216 is used by the label dispenser 250 in conjunction with the Object In Cup signal 122 to dispense a label with correct timing for the label applicator to pick up the label. The Label Applicator at Dispenser signal 216 is generated by turret controller 210 and used by label dispenser 250. Signal 216 is also functionally described as a servo tach output, and is utilized in a printer offset function, which will be described in greater detail below.

An Object in Cup signal 122 indicates an object 102*a* is in a cup 103 that will eventually contact a label depositor arm 202. The Object in Cup signal 122 is used by label dispenser 250 in conjunction with the Label Applicator At Dispenser signal 216 to dispense a label with correct timing for the label depositor arm 202 to pick up the label. The Object in Cup signal 122 is generated by conveyor controller 120 and is used by the label dispenser 250.

A produce sizer and grader scanner 130 is perched above conveyor 100. If there is produce in a cup, label dispenser will need size and grade information in order to print the label. Scanner 130 utilizes object recognition software to generate a size and grade signal 132 which is transmitted to label dispenser 250. Label dispenser 250 uses the size and grade data to direct a search through a look-up table to retrieve the appropriate label graphics.

To accommodate high speed operation the Label Dispenser needs to accurately know when the Label Applicator is in position to accept a label. To do this the Turret's position must first be determined by the Turret Controller. This is done by "homing" the Turret. Homing is done by spinning the turret until the Turret Proximity Sensor is lined up with the sensor's Activator which activates the Turret At Home signal. Because the Sensor is attached to a fixed location on the system's frame and the Activator is on the Turret, this signal turns on when the turret is in a specific "Home" location.

To increase the accuracy of this process the turret is spun at normal speed until the Turret At Home signal is detected. Then the turret is backed up a short distance and then rotated forward again at a much slower rate which increases the accuracy by increasing the number of times the Turret Controller can check for the Turret At Home signal per unit of rotation. When the signal is detected the Turret is stopped and is considered "Homed".

Once the Turret is in the Home location the Turret Controller can generate the Label Applicator At Dispenser signal as the Turret spins in a way that is consistent in relation to the position of the Label Applicators. The Turret Controller can also offset this signal from the home position to account for differences in the physical locations of the Turret Proximity Sensor relative to the Label Dispenser due to design or manufacturing variability. This is currently known as a "Printer Offset". The value of this offset is determined by the user through visual inspection of the position of the labels on the Label Applicator after they are deposited there by the Label Dispenser.

As the conveyor shaft 104 rotates, conveyor encoder 106 translates shaft motion into output pulses on the encoder's A phase signal 108 which represent even increments of motion on the conveyor. The Turret Controller 210 recognizes these pulses and uses them to drive Turret Motor 214 in a way that synchronizes the movement of Turret 200 so that the speed at the radius 240 at which the label is applied matches 1 to 1 with the conveyor carrying the items onto which the labels are applied.

In addition to maintaining speed with the conveyor, turret controller 210 needs to line up the label depositor arms 202 with the conveyor cups 103 while turning. In order to do this, when starting the turret, the turret controller 210 waits until it detects the Index Pulse 110 signal from the Conveyor Shaft Encoder before it starts. Once started the Turret Controller keep a count of A Phase pulses and adjusts the Turret's position to match the distance traveled by the conveyor. By starting at a specific position of the Conveyor's shaft the Turret position is consistent relative to the Conveyor Cups. In other words, the Index Pulse signal 110 represents an absolute radial position on conveyor shaft 104. The relationship between that absolute radial position and a cup position is known. The Turret at Home signal 222 represents an absolute radial position of the turret. The relationship between the absolute turret position and a label applicator is known. Therefore, proper sequencing between the Index Pulse 110 and the Turret at home signal 222 can keep label depositor arms 202 in synchronous motion with cups 103.

To ease stress on the Turret Motor it is accelerated from a stopped position gradually to a speed slightly faster than the conveyor until it has move the same distance traveled by the Conveyor and the Conveyor Cups and Turret are in line. At that time the speed is reduced to match the A Phase signal.

To adjust for differences between the Conveyor cup position and the Index Pulse signal from the Conveyor Shaft Encoder an offset is used. This offset, called the "Conveyor Offset", is added to the target position of the Turret Motor by the Turret Controller to change the Turret position so that when it is synchronized with the Conveyor the Label Applicators line up with the Conveyor Cups. The Offset is determined by the operator using visual inspection of where the labels are applied on the objects. The Conveyor Offset signal is logically grouped as part of the motion control signals 212.

The above description sets forth a combination of features which are not present in the prior art. In order to compensate for the differences in produce position, increase accuracy and operate at high labeling speeds, the invention includes at least a combination of a Conveyor Offset Signal and a Printer Offset Signal.

In contrast to the prior art, the present invention provides a turret which is continuously rotating, for example, by servo motors. The conveyor offset signals compensate for contraction and expansion of the conveyor chain, or if the chain skips a sprocket. In addition, the printer offset signal allows the label to be dispensed on to different positions at the boot tip. For example, with 12 boots, the label position can be adjusted up to 2.5%, or in 0.75 degrees increments with a range of plus or minus 5 degrees.

The turret contains multiple flexible label depositor arms, typically an even number of arms, such as 8 or 12 located around the circumference of such turret. Each flexible label depositor arm has several elements that are crucial to its proper performance and functionality. The flexible label depositor arm is the part of the device that receives the label as it is ejected by the printer/dispensing unit and then applies it to the product.

The printing/dispensing unit located over the label depositor arm ejects labels on demand with the adhesive side facing up. The turret, which is in constant rotational movement synchronized with the product carrier underneath, picks up the ejected labels by means of the multiple flexible label depositor arms. Each flexible label depositor arm contains a hollow square shaft, which has a cam follower at one end and a bellow holder at the other end. The cam follower rides on the interior wall of a cam that is designed to extend the square shaft outwards from the center of the turret as it rotates toward the 6 o'clock position. As mentioned above, at the other end of the square shaft there is a bellow holder, which holds an extended flexible bellow. At the end of the extended bellow there is a removable boot tip. The boot tip has a center core that is used both, to attach to the bellow and to direct positive and negative air to the surface of the boot tip. It is at the surface of the boot tip that the label is received as the printer/dispensing unit ejects it.

At the core of each square shaft there is a rigid tube that directs the positive or negative air from the center air manifold to the bellow holder and in turn to the inside of the extended bellow and subsequently to the surface of the boot tip. The rigid tube is held at one end by a ring located over the air manifold and rotates with the turret. This tube glides in and out of the center of the square shaft as it extends and contracts by the cam profile. This is how the air (both positive and negative) is directed from the center of the turret to the surface of each boot tip.

The negative air (vacuum) is used to pick up the label as it is ejected from the printer/dispensing unit and to hold the label in place at the center of the surface of the boot tip until it is time to be applied onto the surface of the product. At this time the air system switches to positive air and the label is released from the surface of the boot tip. The positive air is not only used to release the label from the boot tip onto the surface of the product, but also to increase resistance to the bellow as it is compressed during the application process. The positive air can be regulated by means of a valve in order to determine the force of resistance necessary to both, release the label from the boot tip, and to increase the downward force of resistance on the extended bellow. The positive air regulation is of particular interest at it is crucial to the process of releasing the label from the boot tip during the label application on wet surfaces. Likewise the regulation of bellow compression is necessary to accommodate multiple uses on different products such as those with fragile/sensitive or irregular shaped characteristics.

The extended bellow 18 and removable boot tip 16 combination offers high labeling effectiveness on products with irregular shape, such as bell peppers or avocadoes. The boot tip is made out of a flexible food-grade silicone material design to grab the product at it makes contact with its surface. As the boot tip grabs the surface of the product, the flexible extended below moves in the direction that the boot tip dictates following the contour of the product. This design is also useful in situations were the product is traveling off-center from the application axis. As long as the boot tip makes partial contact with the surface of the product it will force it self to follow the product. The boot tip is also design to be removed and replaced from the extended bellow for ease of operation and maintenance. As the boot tips are in constant contact with the product, these are exposed to foreign substances and bi-products such as wax or bloom located on the surface of the product. These foreign substances and bi-products will be eventually deposited on the surface and air holes of the boot tips. The required grabbing action of the boot tip and the effectiveness of the airflow will be eventually compromised and they will be required to be cleaned. By having boot tips that are easily replaced, we improve the simplicity of maintenance and system operation.

Another element of the design is that the boot tips could be made from a variety of materials, shapes and surface finishes that could improve the performance of the application in a diverse number of situations. The change of boot tips represents cost effective maintenance and ease of operation, not to mention its valuable versatility.

Vacuum is generated via 1 or more air pumps generating 150 CFM each. The negative air outlets are connected to one or both ends of the system's frame through a flexible hose and air couplings. This system's frame (aluminum extrusion) also serves as a double air tank/chamber. The top part of the cross member houses the positive air chamber and the bottom part houses the negative air chamber. The vacuum is distributed to each of the labeling lanes via a semi-flexible hose exiting the negative air chamber and connecting to the rear side of each labeling turret. The vacuum is directed to an air manifold located at the rotating center of the turret. The vacuum flows to sections of the turret that require negative air in order to capture labels that are ejected from the printer/dispensing unit above. The section in the turret receiving the vacuum starts at about 11 o' clock (this is the position were the label could potentially be first ejected), and ends at about 5 o' clock (this is the position were the label first makes contact with the product). The vacuum flows from the center of the turret to each of the depositors located around the turret within the section described above by means of rigid plastic tubes inserted in a ring that rotates around the air manifold. These tubes are fitted into square shafts that slide in and out of the turret as the rotate around. Bellow holders are located at the end of each square shaft. These holders hold extended bellows, and at the end of each bellow there is a boot tip. These bellow tips are the ones that hold the labels and make contact with the product to be labeled. The main purpose of this vacuum system is to hold the label from the ejection point to the application area were the boot tip first makes contact with the surface of the product to be labeled. This process needs to be accomplished with high efficiency and low fiction and rotational resistance.

The positive air generated by a central air compressor. The high-pressure air is first connected to a chiller dryer to eliminate most of the moisture in the air. Then the air is passed through an oil filter and a secondary filter/regulator before it is introduce into the labeling system. Once the air is conditioned and filtered, it is connected to the upper section of the aluminum frame as previously described under the vacuum system description. The air is distributed to each of the labeling lanes via a small flexible hose. The air is then split into a two-valve system. The first valve controls the air volume that is directed to the printer/dispensing unit, and the second valve controls the air volume that is directed to the turret. The air directed to the printer/dispensing unit is used to: a) blow away possible dirt accumulated on the label material before it is exposed to the print-head, and b) to push down the labels down into the surface of the boot tips as they are being ejected from the printer/dispensing unit. The air directed to the turret is introduced into the air manifold and it used to both: a) blow the label away from the boot tip onto the surface of the product being labeled, and b) to create resistance from the extended below to contract during the process that it is engaged in the application process. The positive air is directed to the boot tips in the same manner as the vacuum. The only difference is that the positive air is directed in the sector of the turret that starts at about 5:30 and ends at about 8 o'clock. This process also needs to be accomplished with high efficiency and low friction as well as effective separation between the negative and positive air chambers within the air manifold. Air contamination between both chambers would render the system incapable of accomplishing the task.

The flexible label applicator features in combination with the air systems provides numerous advantages over the prior art. First, the present invention utilizes bellows 18 which are pre-expanded. The bellows are not pressurized, and therefor can flex front-to back and sideways when they come in contact with a produce surface that is not level. Vacuum and pressure are used to capture labels from the on-demand printer, and then apply them to the produce. However, vacuum/pressure is not utilized to contract or expand the arms or bellows. Rather the extension and contraction of the arms are decoupled from the vacuum/pressure systems. The turret is equipped with a camming surface and the arms are constructed as telescoping structures. The movable part of the telescope carries a cam follower which rides along the camming surface. The speed and rotational position at which each arm extends is controlled by this mechanical linkage, and therefore is always precise at any turret speed. More specifically, as the turret motor rotates the turret the label depositor arms are extended outwardly by means of a compression spring housed within the square shaft and around the inner shafts. Their maximum extension is then mechanically limited by the cams contacting the camming surface of the fixed cam wheel. A further advantage is that autonomously to the force applied by the compression spring, the positive pressure which pushes the label on to the fruit can be independently adjusted.

Figure 3:
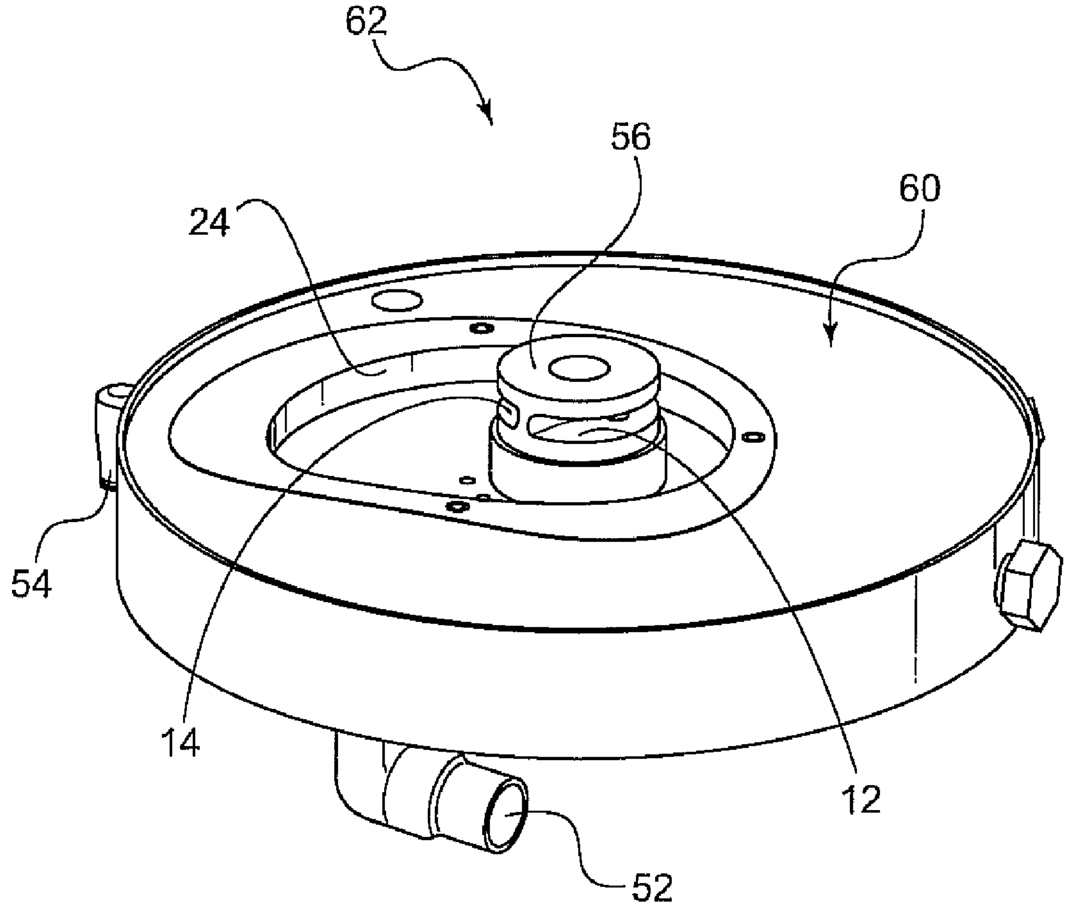
FIG. 3 is a perspective view of the fixed turret section.

As can be seen in FIG. 3, a fixed turret section 62 is provided, which includes a cam wheel 60 having a radially inwardly facing camming surface 24. Fixed turret section 62 is suitably mounted above one lane of produce conveyor 100 taking into account radial distance 240. A vacuum source is coupled via vacuum line 52 to vacuum manifold chamber 12. A source of pressurized air is coupled via pressure line 54 to pressure manifold chamber 14. Fixed turret section 62 is oriented with pressure manifold chamber 14 in the 6 o'clock position (see FIG. 6). In this orientation, the camming surface 24 is at its greatest outward radial distance. As will be explained in greater detail below, label depositor arms 202 will extend fully at the 6 o'clock position, engage the produce, and be provided with pressurized air in a coordinated action to apply labels. With pressure manifold oriented downwardly, the vacuum manifold chamber 12 will extend from about the 10 o'clock position to about the 5 o'clock position (see FIG. 6).

Figure 4:
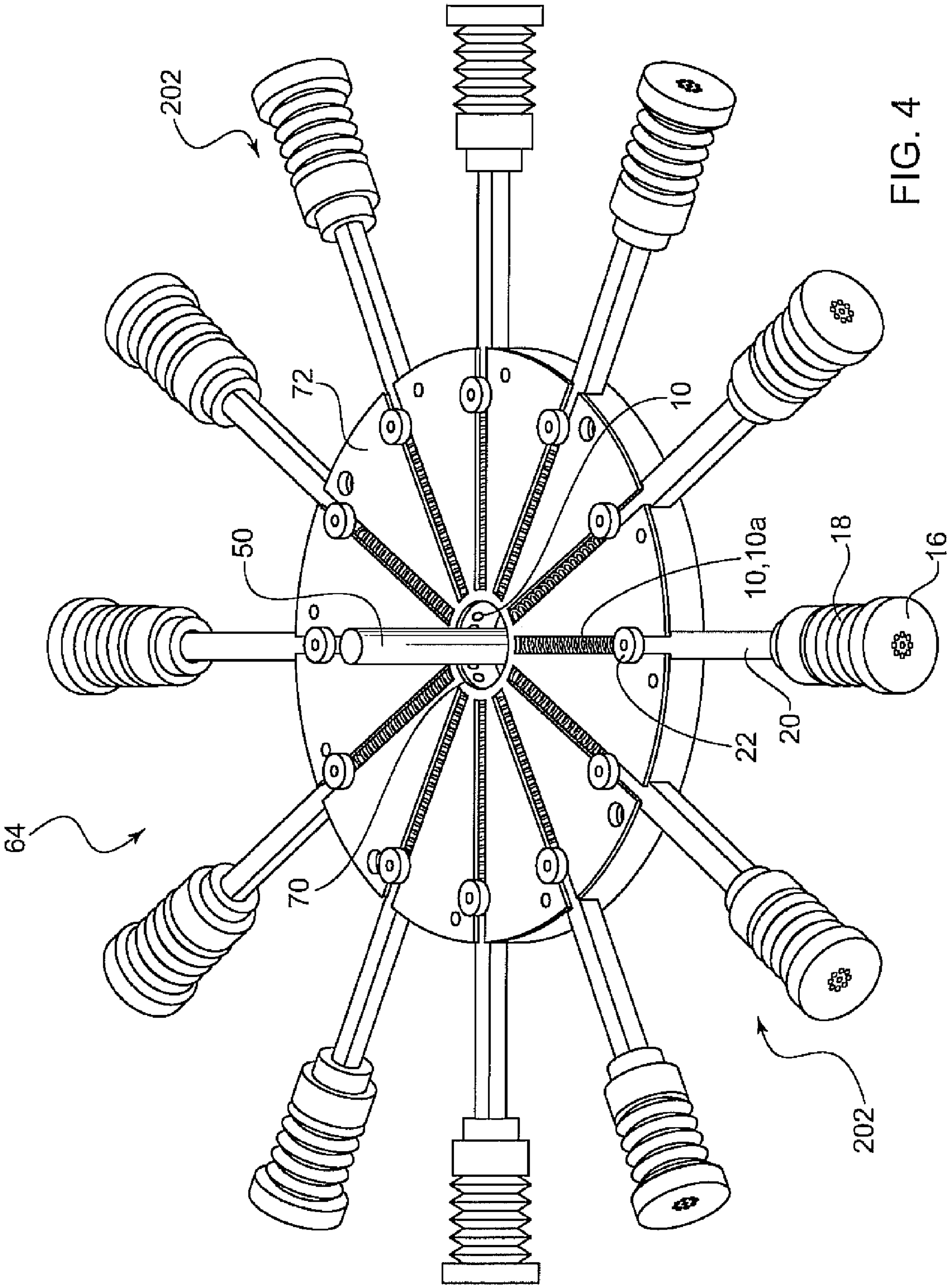
FIG. 4 is a perspective view of the rotating turret section.

As can be seen in FIG. 4, a rotating turret section 64 is equipped with a central axle 50 and a turret plate 72 which supports a plurality of label depositor arms 202. Label depositor arms include an inner shaft 10 which is disposed within a coil spring 10*a*. The coil spring 10*a* provides a biasing force on telescoping shaft 20, urging it radially outwardly. Concentrically surrounding axle 50, the inner shafts 10 terminate in a cylinder 70. Vacuum and pressure is provided at cylinder 70 where it is delivered through inner shaft 10 and telescoping shaft 20 to bellows 18 and tip 16. Tip 16 will acquire a label during a vacuum condition, and will adhere the label to a piece of produce during a pressure condition, as dictated by the radial clock locations of the vacuum and pressure manifolds.

The radially inward end of telescoping shafts 20 is provided with a cam follower 22. During assembly, all telescoping shafts are pushed radially inwardly against the biasing force of the springs toward central axle 50, until their cam followers 22 are approximately adjacent cylinder 70. Rotating turret section 64 is then flipped 180 degrees and mounted onto fixed turret section 62, with central axle 50 passing through the core of air manifold 56. As turret plate 72 approaches cam plate 60, the cam followers drop into the depression formed between air manifold 56 and caroming surface 24. When the telescoping sections are released, they will travel outwardly (as exemplified by arrows 26*a* and 26*b* in FIG. 7) until the cam followers contact the camming surface. Air manifold 56 is made from a strong friction-reducing material and is designed to exacting tolerances to provide axial alignment of the central axle while still allowing it to spin freely. The height 56*a* of air manifold 56 may be dimensioned to support rotating turret section 64 so that turret plate 72 is near, but not touching cam wheel 60. Air manifold 56 may be designed as a removable hub, which can be replaced as needed. Fixed turret section 62 may be formed from plastic, with a hardened metal insert serving as camming surface 24. Channels may be machined within fixed turret section to connect lines 52 and 54 to air manifold 56. Air manifold 56 may be machined to provide a central axial aperture along with internal channels to bring vacuum and air pressure to the air manifold chambers 12, 14.

Figure 5:
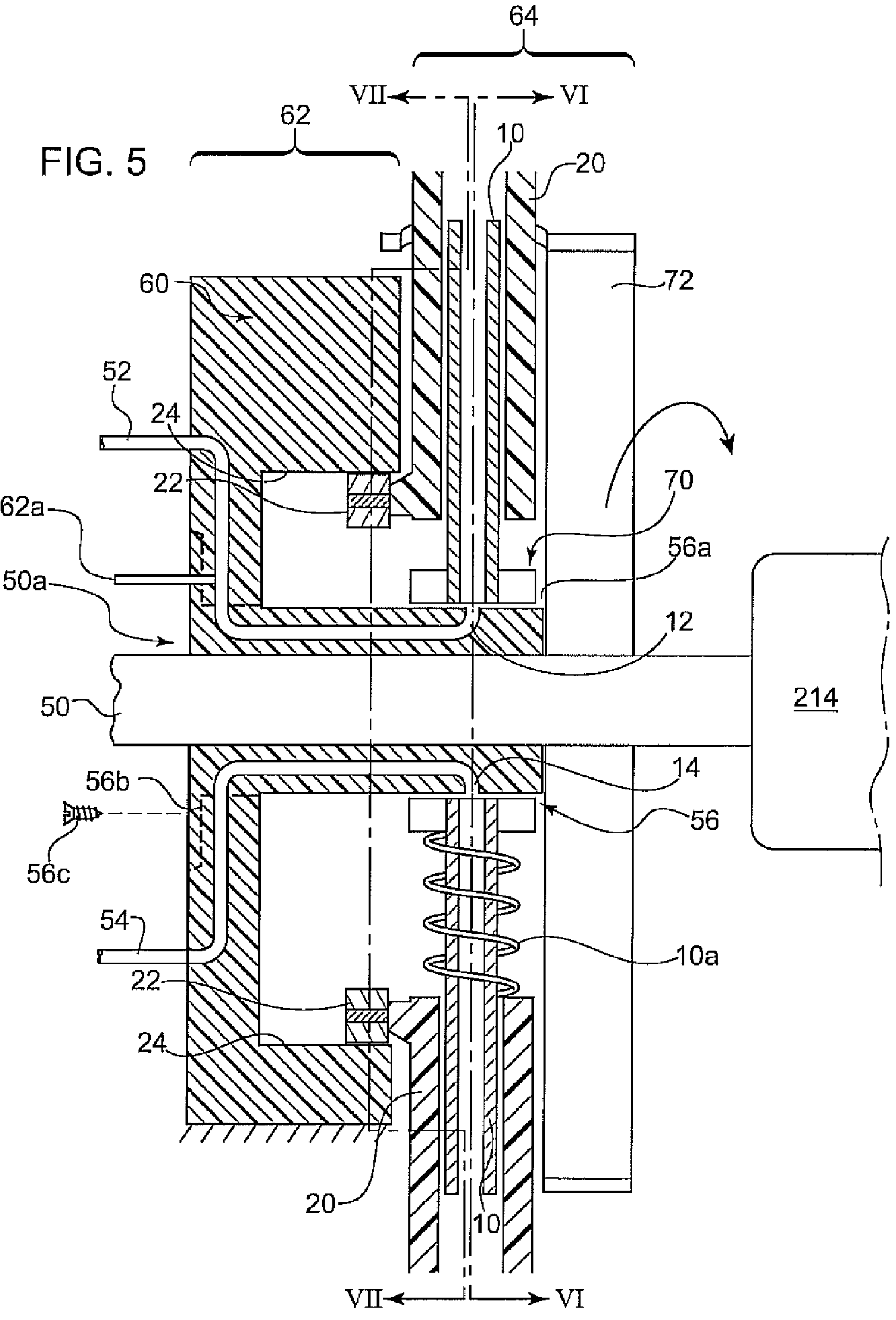
FIG. 5 is an axial cross-sectional view of the assembled turret according to an embodiment of the invention.

A cross-section of the completed assembly is shown in FIG. 5. The left side of the drawing shows fixed turret section 62 with its vacuum line 52 connecting to vacuum manifold chamber 12 and its pressure line 54 connecting to pressure manifold chamber 14 in the 6 o'clock position. An alignment pin 62*a* may be provided to indicate the 12 o'clock position when mounting fixed turret section 62 above conveyor 100, and to ensure that the fixed turret section 62 does not rotate together with the rotating turret section 64. Located centrally within the fixed section is air manifold 56, the left side of which, in the removable embodiment, is outlined by dotted line 56*b*. One or more screws 56*c* or other suitable fasteners, may secure removable air manifold 56 to cam wheel 60. Removable air manifold 56 may include an aperture for accommodating alignment pin 62*a*. This aperature/alignment pin arrangement is also used to insure that the vacuum and pressure lines correctly align with the channels that are machined into air manifold 56 and also to insure that the pressure manifold chamber 14 is aligned to the 6 o'clock position. As can be seen in FIG. 3, air manifold 56 communicates pressure and vacuum from the bottom side of fixed turret section 62, through cam wheel 60 to the air manifold chambers 12 and 14.

The right side of FIG. 5 shows the rotating turret section 64 with its central axle 50 which is driven by a servo motor. However, it should be understood that other suitable drive arrangements are possible, as in the case of direct drive systems. Central axle 50 rotates within the air manifold 56. Air manifold 56 is located concentrically between axle 50 and cylinder 70. The height 56*a* of air manifold 56 is used to control the axial spacing between fixed and rotating sections. To secure the sections together a collar may be affixed to central axle 50 at location 50*a*. Between the collar and fixed turret section 62, there may be provided one or more washers, for example, a Belleville washer sandwiched between two washers. This Belleville washer arrangement allows the rotating turret part to spin freely with respect to fixed turret section, with a degree of freedom to absorb vibrations. In one embodiment, the assembled turret is mounted to a frame disposed over the conveyor. The frame includes a bearing block which contains an aperture for receiving alignment pin 62*a*, to insure that fixed turret section 62 remains stationary. The bearing block is attached to the frame at the bottom by means of a keyed entry and screws. During installation both pin 62*a* and central axle 50 slide into the aperture and multiple bearing's internal cores located at the bearing block. Once aligned, the bearing block is secured to the frame by two screws and the turret is secured to the bearing block. Vacuum and pressure sources are then connected to the air and vacuum couplings 54 and 52. As central axle 50 exits the fixed turret section at 50*a*, it passes through the bearing block, which is in turn attached to the bottom of the frame, then through the washer/collar assembly, and into a gearbox. The gearbox is secured to axle 50 via a key and keyway connections. For example, a 90 degree gearbox with a 12 to 1 step down ratio is connected between a servo motor and axle 50, to increase torque. The bearing block includes 2-3 bearings. The bearing block totally supports the weight of the rotating turret section, including forces that are generated during high speed rotation thereof. Accordingly, contact and wear on air manifold 56 can be greatly reduced or eliminated by having the axle supported in the bearing block, and by machining the aperture through the core of manifold 56 to be slightly larger than the axle dimensions.

As the axle is rotated, it spins turret plate 72 and cylinder 70 to selectively bring inner shafts 10 into communication with the top vacuum manifold chamber 12 and the bottom pressure manifold chamber 14. Coil springs 10*a* bias telescoping sections radially outwardly, thereby maintaining cam followers 22 in rolling contact with cam surface 24. While only one spring is shown for the sake of clarity, it should be understood that each label depositor arms 202 includes a spring. On the top of FIG. 5, i.e. the 12 o'clock position, the telescoping shaft is retracted in the radially inward position. On the bottom of FIG. 5, i.e. the 6 o'clock position, the telescoping shaft is extended to radial distance 240. Cam followers 22 include a roller that is affixed to the lower end of shaft 22.

Figure 6:
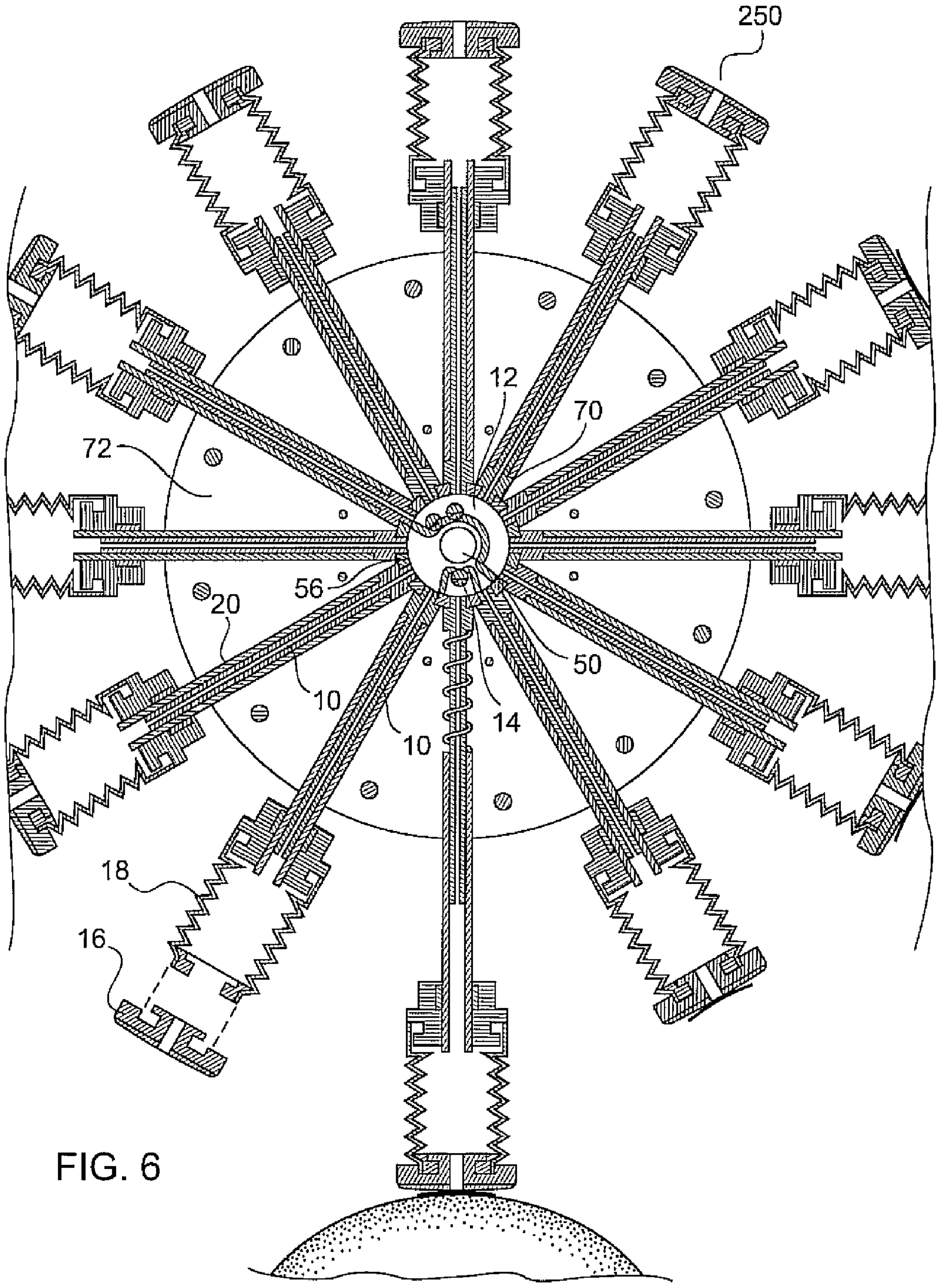
FIG. 6 is a cross sectional view taken along the line VI-VI from FIG. 5.

FIG. 6 is a cross-sectional view of the pressure and vacuum manifold chambers. In this view, only air manifold 56 is stationary. Central axle 50 and turret plate 72 which supports the depositor arms rotate about air pressure manifold chamber 14 and vacuum manifold chamber 12 at high speed. Each depositor arm includes an inner shaft 10 having a circular cross section. The inner shafts 10 terminate in a cylinder 70 which rotates around the air manifold 56, passing across the larger vacuum manifold chamber 12 and then past the smaller pressure manifold chamber 14. The beginning and end points of each manifold chambers are configured and designed so that (i) vacuum is applied to the bellows tip 16 as it passes the label dispenser 250 and moves down toward the produce and (ii) pressure is applied to each bellows tip 16 as it is pushing the label on to the produce. The bellows tip 16 may be in contact with the produce over a range up to 30 degrees. Higher contact time increases the likelihood that the label will remain adhered to a cold, wet, waxy or otherwise contaminated surface. The label depositor arm in the 7 o'clock position shows the tip 16 removed from the bellows 18 for easy replacement. FIG. 6 shows the arm in the 6 o'clock position extended radially outward, however all the arms reciprocate outwardly at various radial positions, as will be described more fully below. While one spring is shown for the sake of clarity, it should be understood that each depositor arm is similarly equipped with a spring.

Figure 7:
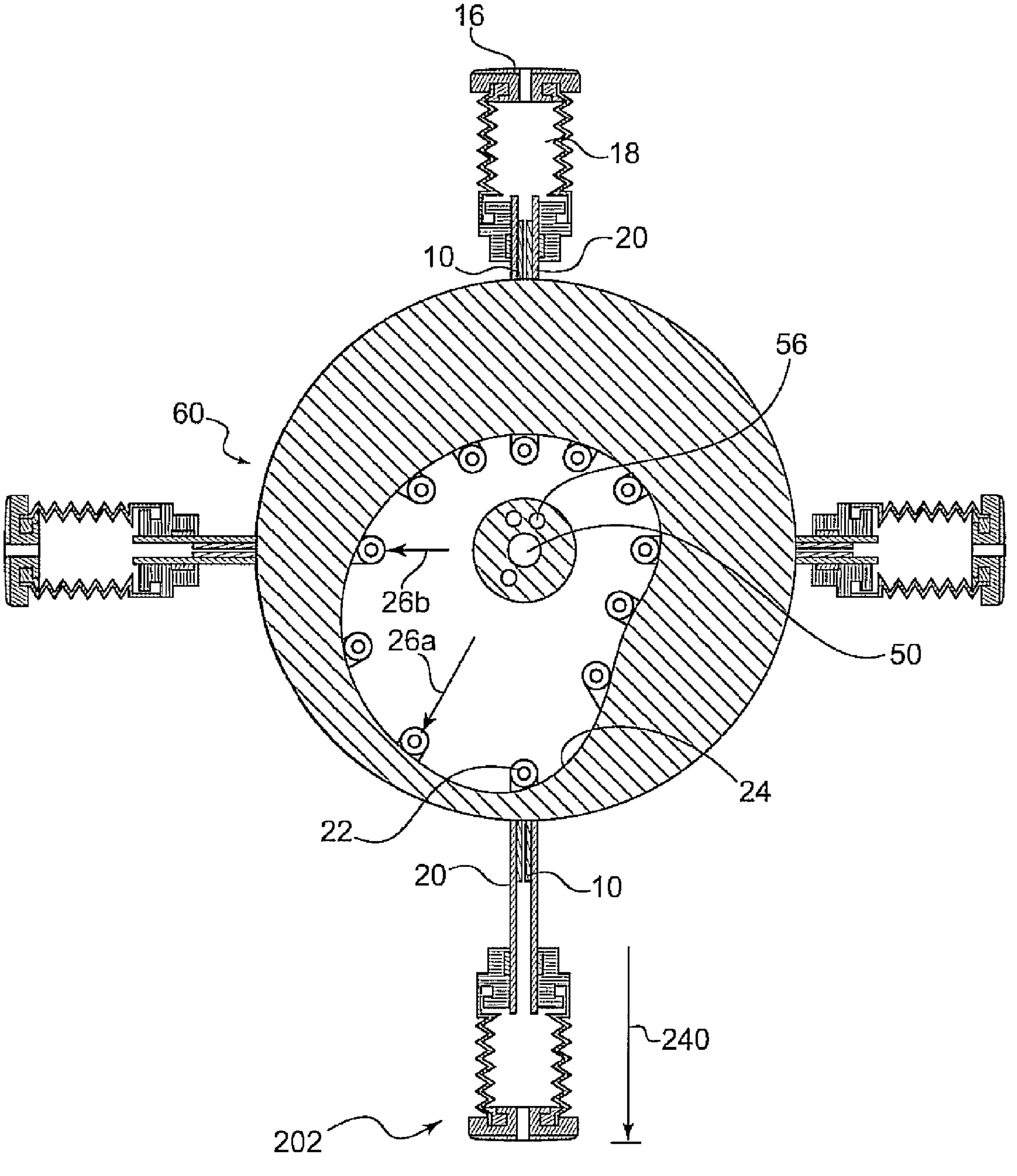
FIG. 7 is a cross sectional view taken along the line VII-VII from FIG. 5.

FIG. 7 is a cross-sectional view of the telescoping mechanism for the label depositor arms 202. In this view air manifold 56 and cam wheel 60 are stationary. Axle 50, cam wheels 22 and all depositor arms are rotating. Only four of twelve arms are shown for the sake of clarity. However, all twelve cam wheels are shown, in various radial positions as dictated by the contour of camming surface 24. Arrows 26*a* and 26*b* indicate that in use the cam followers will be radially extended outward at the periphery of the camming surface 24. This camming surface allows the bellows tip 16 to extend out toward the label dispenser, in a coordinated action with the inner shaft 10 reaching the beginning of the vacuum manifold chamber 12 (as shown in conjunction with FIG. 6). A label is acquired and carried down toward the conveyor. The camming surface 24 allows the bellows tip 16 to be fully telescoped outward for an extended period of time to maximize contact with the produce. In a coordinated action, the inner shaft 10 reaches the pressure manifold 14. The arm in the 6 o'clock position is shown fully extended to radius 240. With cam wheel 60 stationary, it can be seen that the shafts 20 extend out a distance that is dictated by the cam surface 24

The depositors are spring loaded. As the boot tip 16 makes contact with the fruit, the bellows and shaft contract radially inwardly. The spring and positive air flow offer the required resistance to press the label onto the surface of the fruit. The higher the air pressure, the higher the resistance for the bellows to contract. The positive air is useful to apply the label when the surface of the fruit is wet, which is common with items like plums, peaches, nectarines, avocados and pears.

Having described various methods, apparatus, and systems (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention.

What is claimed is:

1. A system for high speed labeling of produce comprising:

one or more continuously servo-driven and controlled rotating turrets having label dispensers and labeling applicators disposed above a corresponding number of conveyor lanes driven by one or more shafts;

a conveyor shaft rotary encoder or encoders which transmits electrical pulses representative of conveyor speed and an indexing signal identifying an absolute radial position of the shaft to a turret controller;

a turret controller receiving the electrical pulses and indexing signal for common control of servo motors for each rotating turret so that the linear speed at the labeling applicators is equal to the conveyor speed;

a conveyor offset signal transmitted to the turret controller for each lane representative of a difference in a conveyor cup position relative to the absolute radial position of the conveyor shaft, so that the tangential relationship between labeling applicators and individual cups can be adjusted for each turret; and a servo tach output from the turret controller comprising a unique printer offset control for each lane that determines when a label is dispensed relative to the corresponding labeling applicator, so that the relationship between the timing of the dispenser's label ejection and the applicators' positions can be adjusted for each turret;

wherein the conveyor offset signal in combination with the printer offset control allows the turret controller to selectively control the radial orientation of each servo motor and the label dispensing timing to independently synchronize the high-speed labeling operation at each lane.

2. The system of claim 1, wherein the conveyor includes one or more carrier chains and the common shaft includes one or more sprockets for engaging the respective chains, wherein each sprocket and carrier chain defines a lane, wherein the system includes means for sensing the chain speed from the shaft's motor and visually displaying the speed for use in setting the conveyor offset signal.

3. The system of claim 1, wherein said rotary encoder transmits A phase signals in the form of a specified number of pulses per revolution, wherein the timing between pulses is proportional to the conveyor's speed.

4. The system of claim 3, wherein each indexing signal is indicative of one reset signal per each carrier chain revolution, wherein the reset signal is used to set the absolute cup position relative to a shaft home position.

5. The system of claim 4, further comprising a turret proximity sensor for each turret which transmits turret home position signals to said turret controller, wherein said turret controller compares index pulses and home position signal to synchronize the radial position of each turret with respect to the cup position on each corresponding lane, wherein the conveyor offset signal adjusts the radial position of the turret with respect to the synchronized position.

6. The system of claim 5, further comprising a conveyor controller coupled between a produce sizer and grader scanner and the label dispenser, wherein the produce sizer and grader scanner generates an object in cup signal and transmits said signal along with size and grade data to the label dispenser for each lane.

7. The system of claim 6, wherein said label dispenser initiates a print function in response to object in cup signal from the produce sizer and grader scanner, wherein said print function comprises applying size and grade data to a look-up table and obtaining label data to print a label on-demand.

8. The system of claim 7, further comprising a label manager for uploading and editing one of graphics, text, bar codes, lot numbers, and variable format date fields into different label images, and further comprising a label select function for selecting individual label images and placing them into the look-up table on-the-fly.

9. The system of claim 8, wherein the label manager edits lot numbers into label images, wherein the lot number references packinghouse records that identify the origin of the produce, wherein the packinghouse records include means to identify the growing field and pre-harvest records, thereby providing full traceability on fresh produce at an item level within a high speed labeling system.

10. An apparatus for high speed labeling of produce comprising:

a rotating turret section including (i) a plurality of depositor arms equally spaced in a radial pattern and each having a pre-expanded bellows and a removably attached boot tip and (ii) a mechanical linkage for reciprocating the depositor arms along a predetermined path as a function of the turret's rotational position;

a supply of vacuum communicated through said turret and selectively delivered to said depositor arms to retain a label on said boot tip until it is applied to the produce; and a supply of pressurized air communicated through said turret and selectively delivered to said depositor arms to provide resistance to boot tip retraction and to provide a positive label application force on to the produce, wherein a turret rotational speed is adjusted to coordinate the positive label application force with a produce position.

11. The apparatus of claim 10, wherein each of said depositor arms includes a shaft and movable sleeve which is telescopically mounted on to said shaft.

12. The apparatus of claim 11, further including a fixed turret section having an air manifold, and wherein said rotating turret section includes a cylinder and a central axle disposed through said air manifold, wherein each of said shafts include a proximate end which terminates in said cylinder that rotates about said fixed air manifold.

13. The apparatus of claim 12, wherein said air manifold includes an air pressure manifold chamber and a vacuum manifold chamber, and wherein said air manifold is located concentrically between said central axle and said cylinder.

14. The apparatus of claim 13, wherein said air manifold is radially oriented to selectively apply pressure and vacuum to each depositor arm at different phases of their rotation.

15. The apparatus of claim 14, wherein said fixed turret section includes a fixed cam wheel, wherein each of said movable sleeves includes a proximate end which terminates in a cam follower that rotates within said cam wheel.

16. The apparatus of claim 15, wherein said cam wheel is axially offset from said air manifold, whereby said depositor arms are radially aligned with said air manifold and each of said cam followers are axially offset from their corresponding movable sleeves to extend into said fixed cam wheel.

17. The apparatus of claim 16, wherein the air pressure and vacuum level can be modulated through said fixed air manifold without effecting sleeve reciprocation which is controlled by the contoured camming surface of said fixed cam wheel.

18. The apparatus of claim 17, wherein the air pressure and vacuum level can be modulated to control the bellows compression force without substantially effecting the bellows front-to-back and side-to-side flexibility.

19. The apparatus of claim 18, further comprising a spring for each depositor aim which biases the movable sleeve radially outwardly to keep the cam followers in contact with the camming surface.

20. The apparatus of claim 19, wherein said air manifold has an inner cylindrical aperture, wherein the central axle extends through said aperture.

21. The apparatus of claim 20, wherein said air manifold includes chambers for communicating pressure and vacuum from said fixed turret section through the cam wheel to said manifold chambers.

22. The apparatus of claim 21, further including a conveyor disposed below said rotating turret, wherein said turret is continuously rotated so that the linear speed at the boot tip of the fully extended depositor arm is equal to the conveyor speed.

* * * * *